United States Patent
Boyer

[11] Patent Number: 5,898,974
[45] Date of Patent: May 4, 1999

[54] ADJUSTABLE HANDLE ASSEMBLY

[75] Inventor: David C. Boyer, Millersburg, Pa.

[73] Assignee: Alvord-Polk, Inc., Millersburg, Pa.

[21] Appl. No.: 08/893,163

[22] Filed: Jul. 15, 1997

[51] Int. Cl.[6] .................................................. A47B 95/02
[52] U.S. Cl. ...................... 16/114 R; 16/121; 16/DIG. 41; 403/296; 403/343; 403/21; 411/433; 74/548
[58] Field of Search .................. 16/114 R, 121, 16/110 R, 111 R, DIG. 41; 403/296, 343, 21; 411/433, 436, 438; 74/553, 545, 548

[56] References Cited

U.S. PATENT DOCUMENTS

| | | | |
|---|---|---|---|
| 422,361 | 3/1890 | Alton | 411/433 |
| 856,436 | 6/1907 | Walden | 269/182 |
| 924,122 | 6/1909 | Williams | 269/182 |
| 2,110,537 | 3/1938 | Tautz | 77/33 |
| 2,218,319 | 10/1940 | Pfauser | 269/182 |
| 2,318,691 | 5/1943 | Huthsing | 77/13 |
| 2,664,768 | 1/1954 | Clyne | 77/34.5 |
| 2,671,482 | 3/1954 | Gordon | 144/305 |
| 2,736,227 | 2/1956 | Stroble | 85/33 |
| 3,570,836 | 3/1971 | Pettavel | 269/92 |
| 4,525,894 | 7/1985 | Knapp | 16/111 R |
| 4,693,656 | 9/1987 | Guthrie | 411/433 |
| 4,787,794 | 11/1988 | Guthrie | 411/433 |
| 4,974,888 | 12/1990 | Childers | 292/251 |
| 4,978,261 | 12/1990 | Wright, III | 409/218 |
| 5,096,340 | 3/1992 | Forsgren | 408/14 |
| 5,252,010 | 10/1993 | Obrecht et al. | 408/241 S |
| 5,371,919 | 12/1994 | Winkler | 16/114 R |
| 5,425,156 | 6/1995 | Strait et al. | 16/114 R |
| 5,513,544 | 5/1996 | Winkler et al. | 74/548 |
| 5,533,232 | 7/1996 | Boyer | 16/114 R |
| 5,577,868 | 11/1996 | Chen | 408/14 |

FOREIGN PATENT DOCUMENTS

| | | |
|---|---|---|
| 1219151 | 3/1987 | Canada . |
| 2437756 | 3/1975 | Germany . |
| 9891 | 11/1905 | United Kingdom . |
| 597381 | 1/1948 | United Kingdom . |
| 994271 | 6/1965 | United Kingdom . |

*Primary Examiner*—Chuck Y. Mah
*Attorney, Agent, or Firm*—Thomas Hooker, P.C.

[57] ABSTRACT

An adjustable handle assembly includes a pedestal with an axial bore for mounting on a threaded shaft, a handle extending radially and upwardly away from the pedestal and a shaft release plunger radially removable in the pedestal. The shaft release plunger includes a threaded surface for selectively engaging and disengaging the shaft. Disengagement of the plunger allows rapid movement of the assembly along the shaft. The handle applies a torque to the pedestal when the plunger is engaging the shaft which allows the pedestal to exert a clamping force.

23 Claims, 3 Drawing Sheets

ADJUSTABLE HANDLE ASSEMBLY

FIELD OF THE INVENTION

The invention relates to a handle assembly mounted on a shaft.

BACKGROUND OF THE INVENTION

Clamping assemblies involving a threaded nut and shaft are generally known in the art. These assemblies are used for various clamping applications by threading the nut on the shaft and using the nut as a clamping or stop member.

Adjustable nuts used for quick release stop and guide members on drilling machines are known. For example, Guthrie U.S. Pat. No. 4,693,656 discloses a "Quick Adjusting Nut" for use on a threaded shaft. The disclosed nut includes a button element with a threaded bore that can be selectively engaged with the shaft.

Conventional handle assemblies are fixedly mounted on shafts and not moveable along the shaft.

SUMMARY OF THE INVENTION

The present invention is an improved adjustable handle assembly for clamping objects using a threaded shaft. The adjustable handle assembly includes a pedestal, a handle extending away from a top of the pedestal, and a radially moveable plunger. The pedestal includes an axial bore extending through the pedestal from top to bottom for mounting on a threaded shaft. The assembly engages the shaft through a threaded surface on the plunger. The threaded surface on the plunger is disengaged from the shaft when the plunger is depressed.

The assembly is mounted on the threaded shaft by depressing the plunger and moving the assembly freely along the shaft. When the bottom of the pedestal is moved into engagement with the object to be clamped or against an additional clamping member, the plunger is released causing the assembly to engage the threaded shaft. Clamping pressure can then be increased by rotation of the handle about the threaded shaft. Rotation of the handle assembly while engaging the shaft causes axial movement of pedestal along the shaft and applies a clamping force.

Selective engagement and disengagement of the assembly allows for rapid axial positioning of the assembly on the shaft. In addition, depression of the plunger allows for rapid removal of the clamping force. The handle provides a convenient, readily available means to apply and increase a clamping force. Additionally, the improved adjustable handle assembly can be quickly engaged or disengaged saving time and effort. Incorporation of a handle in the assembly eliminates the need to use an additional tool for clamping and unclamping.

Other objects and features of the invention will become apparent as the description proceeds, especially when taken in conjunction with the accompanying drawings illustrating the invention, of which there are five sheets and one embodiment.

DESCRIPTION OF THE PREFERRED EMBODIMENT

Figure 1:
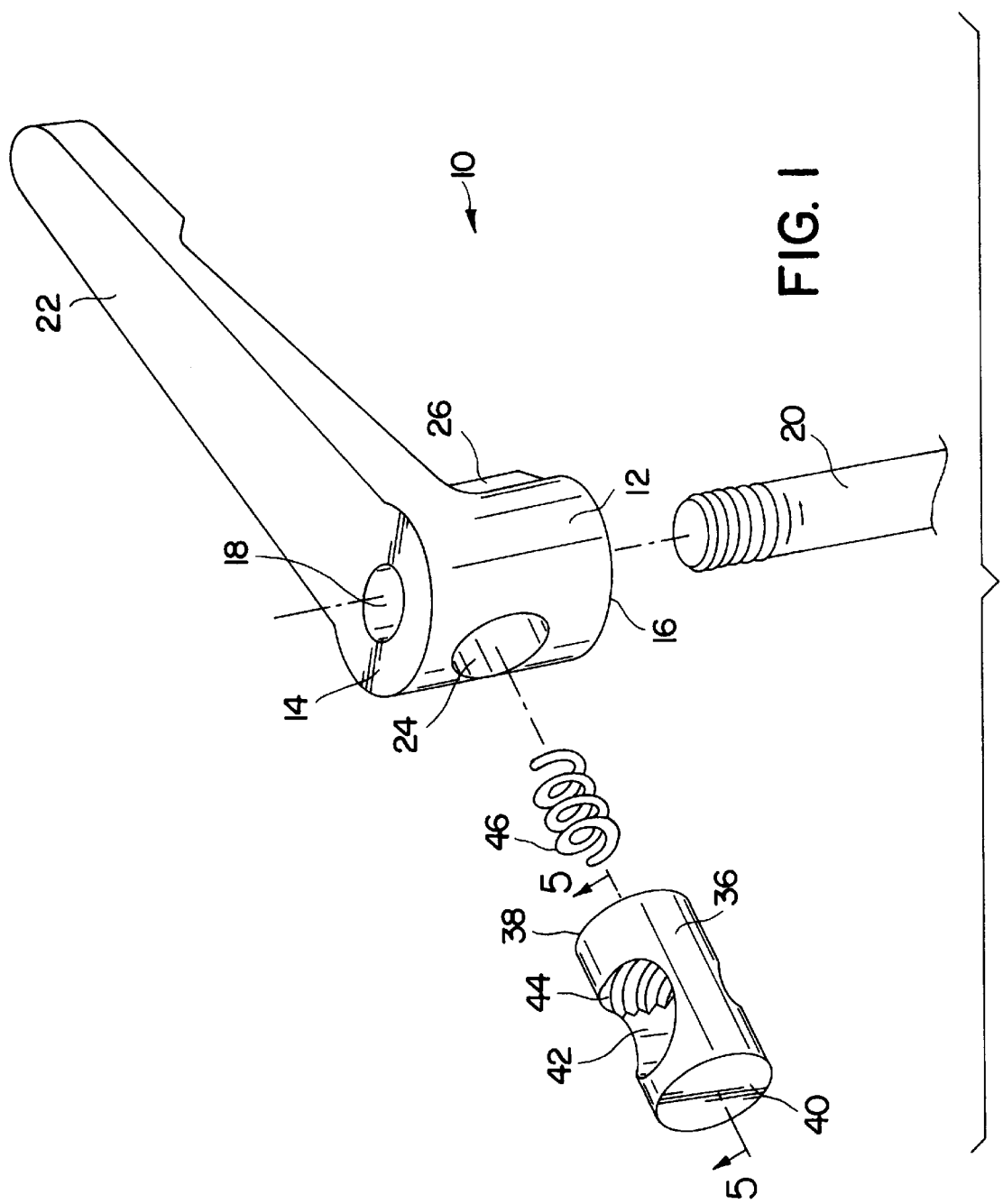
FIG. 1 is an exploded view of an adjustable handle assembly according to the invention.

An adjustable handle assembly 10 includes a generally cylindrical pedestal 12 with a top 14, a bottom surface 16, and a shaft bore 18 extending from top 14 to bottom 16. The bore 18 is sized to allow free sliding movement of the assembly 10 on a threaded shaft 20 as shown in FIG. 1.

The assembly 10 also includes a handle 22 joined to the top 14 and extending radially and upwardly away from the pedestal 12. The handle 22 provides an arm to rotate the assembly 10 about the threaded shaft 20. See FIG. 1.

The pedestal 12 includes a transverse passage 24 extending through the pedestal 12 and a protuberance 26 extending underneath the handle 22. The transverse passage 24 extends into the side of the pedestal 12 away from the protuberance, through the bore 18, and into the protuberance 26. The transverse passage 24 has an opening 28 in the outer surface of the pedestal 12 opposite the handle 22 and a closed end 30 in the protuberance 26.

Figure 2:
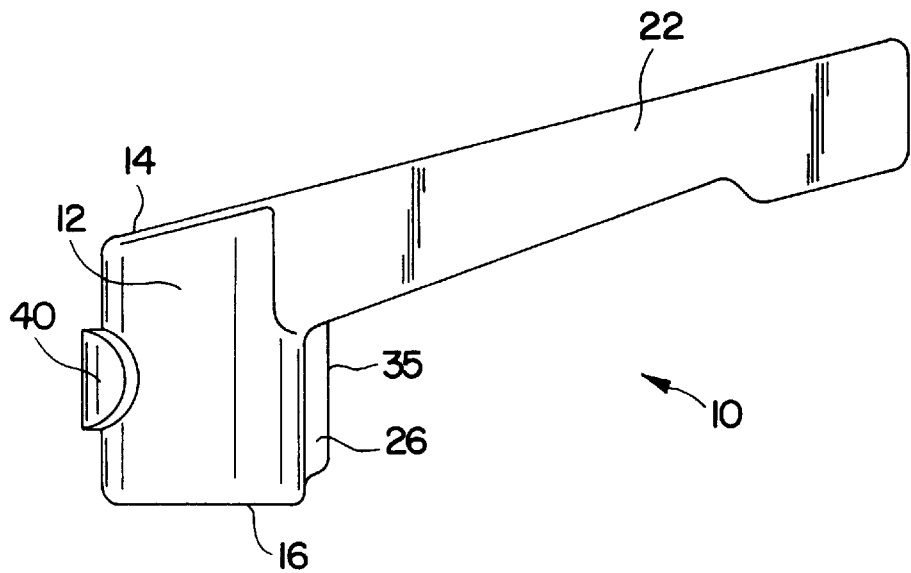
FIG. 2 is a side perspective of the adjustable handle assembly.
Figure 3:
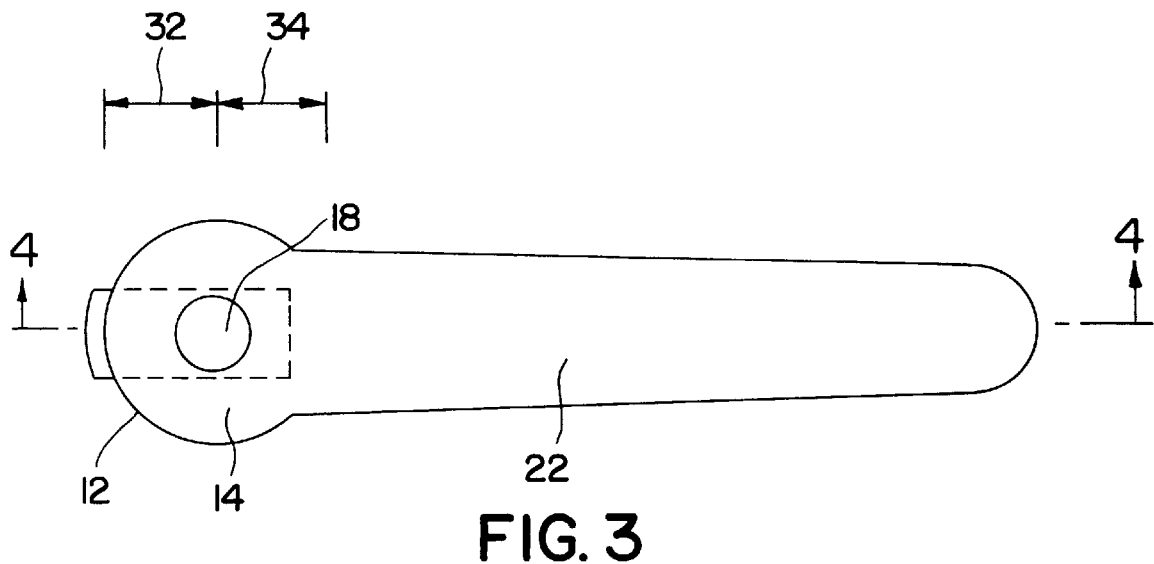
FIG. 3 is a top view of the adjustable handle assembly.
Figure 4:
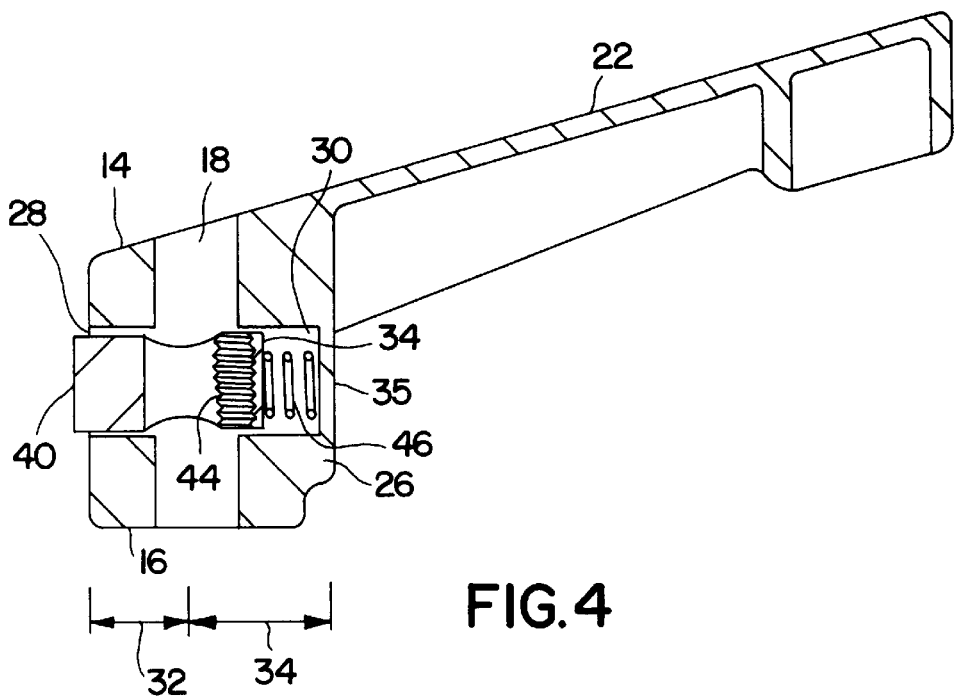
FIG. 4 is a sectional side view of the handle assembly taken generally along line 4—4 of FIG. 3.

A first distance 32 is defined by the distance from the bore 18 to the opening 28 in the pedestal 12. A second distance 34 is defined by the distance from the bore 18 to the outer surface of the protuberance 26. See FIGS. 3 and 4. The second distance 34 is preferably greater than the first distance 32. This can be accomplished by projecting the protuberance 26 outwardly from the pedestal 12 when the bore 18 is coaxial with the pedestal 12 or offsetting the bore 18 towards the opening 28. FIGS. 1, 2 and 4 illustrating an outwardly projected protuberance 26. An offset bore 18 is not shown.

Protuberance 26 preferably extends outwardly from the pedestal 12 underneath and parallel to the handle 22. The protuberance 26 extends along the outer surface of the pedestal 12 from the top 14 towards the bottom 16. The outer surface of the protuberance 26 forms a hidden surface 35 underneath the handle 22. The protuberance 26 is hidden under the handle 22 and is not normally observed by a user. Thus, the protuberance does not alter the visual impression that the pedestal 12 is cylindrical, while permitting an increased length of the passage 24.

A member or shaft release plunger 36 is disposed in the transverse passage 24. The member 36 has a rear face 38 adjacent the closed end 30, a front face 40 normally extending out of the opening 28, and an elongate aperture 42 surrounding the bore 18. See FIG. 4.

Figure 5:
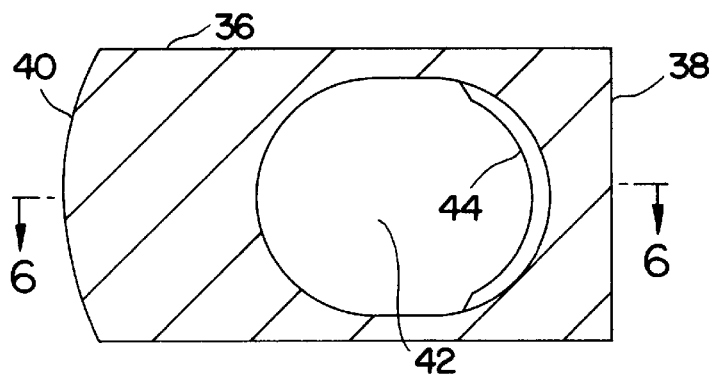
FIG. 5 is a sectional view of a shaft release plunger according to the invention taken generally along line 5—5 of FIG. 1.
Figure 6:
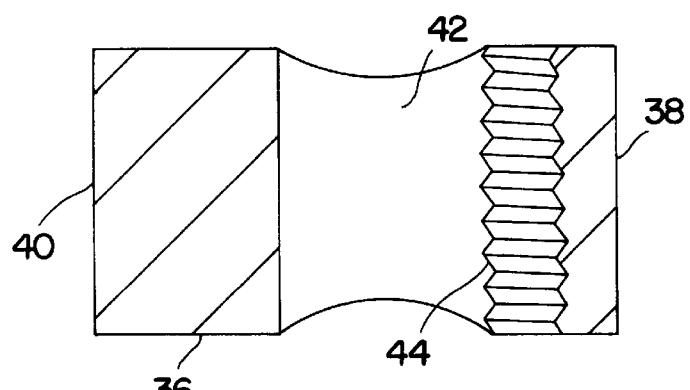
FIG. 6 is a sectional view of the shaft release plunger taken generally along line 6—6 of FIG. 5.

The aperture 42 has a threaded surface 44 along a portion of the inner surface adjacent the rear face 38. As shown in FIG. 5, the threaded surface extends around only a portion of the inner surface of the aperture 42.

A spring 46 is confined between the rear face 38 and the closed end 30. The spring 46 biases the member 36 outwardly from the pedestal 12. When the assembly 10 is mounted on the threaded shaft 20, the spring 46 biases the threaded surface 44 into engagement with the threaded shaft 20.

The assembly can be axially moved along the threaded shaft 20 by depressing the front face 40 of the plunger. An operator begins by pressing on the front face 40 causing the plunger 36 to compress the spring 46. Compression of the spring 46 allows the aperture 42 to be aligned with the bore 18 allowing free movement of assembly 10 along threaded shaft 20. The operator releases the front face 40 when the assembly 10 is in the desired axial position. The desired axial position usually corresponds to the point where the bottom surface 16 engages the object to be clamped.

When the plunger is released, the spring 46 biases the plunger 36 outwardly to push the front face 40 out of the opening 28 away from the pedestal 12 and hold the threaded surface 44 of the aperture 42 against the threaded shaft 20 to clamp the assembly 10 to the shaft.

Axial movement of the assembly 10 is prevented by engagement of the threaded surface 44 and the threaded shaft 20. The operator can then rotate the handle 22 to apply torque to the pedestal 12. The torque rotates the pedestal 12 forcing the bottom 16 against an object to be clamped. The handle 22 is rotated until a sufficient clamping force is being applied by bottom 16.

The operator disengages the assembly 10 by pressing the extended front face 40 to force the threaded surface 44 from engagement with the shaft 20. This releases the clamping force applied by the bottom 16. Reengagement occurs by releasing the front face 40 and allowing the spring 46 to bias the threaded surface 44 into engagement with the shaft 20. Thus, the assembly can be quickly positioned axial to begin applying clamping pressure and just as quickly disengaged from clamping.

Many variations in the structure and composition of the elements describe are possible.

For instance, the pedestal 12 and handle 22 are preferably made as an integral body from steel or plastic. The member or plunger 36 is preferably a steel cylinder with the rear face 38 flat and the front face 40 rounded to conform to the outer surface of the pedestal 12. The transverse passage 24 preferably extends from one side of the pedestal 12 opposite handle 22 into the protuberance 26. However, the transverse passage 24 can extend from one side of the pedestal 12 into an opposite side of the pedestal 12. The bore 18 is preferably circular with a diameter approximately equal to a diameter of the transverse passage 24 which is also preferably circular.

While I have illustrated and described a preferred embodiment of my invention, it is understood that this is capable of modification and I, therefore, do not wish to be limited to the precise details set forth, but desire to avail myself of such changes and alterations as fall within the preview of the following claims.

What I claim as my invention is:

1. An adjustable handle assembly for clamping on a threaded shaft, comprising:
   a pedestal having a top and a bottom;
   a bore extending through the pedestal from the top to the bottom;
   a handle joined to the top and extending away from the pedestal;
   a transverse passage opening on one side of the pedestal and extending through the bore and into an opposite side of the pedestal, the transverse passage having an opening in one side of the pedestal and an end in the opposite side of the pedestal;
   a member disposed in the transverse passage, the member having an aperture surrounding the bore, a front face normally extending out of the opening, and a rear face adjacent the end of the transverse passage; and
   a spring confined between the end of the transverse passage and the rear face of the member, the spring biasing the member outwardly from the pedestal.

2. The assembly as claimed in claim 1 including a protuberance extending from the pedestal under the handle, wherein the end of the transverse passage is located in the protuberance and the passage opens away from the handle.

3. The assembly as claimed in claim 2, further comprising a first distance between the bore and the opening and a second distance between the bore and the protuberance, the first distance being approximately equal to the second distance.

4. The assembly as claimed in claim 2, further comprising a first distance between the bore and the opening and a second distance between the bore and the protuberance, the first distance being smaller than the second distance.

5. The assembly as claimed in claim 4, wherein the bore is generally circular with a bore diameter and the transverse passage is generally circular with a passage diameter, the bore diameter being approximately equal to the passage diameter.

6. The assembly as claimed in claim 1, wherein the aperture has a threaded surface facing the bore adjacent the rear face.

7. The assembly as claimed in claim 3, wherein the pedestal defines an axis and the bore extends through the axis.

8. The assembly as claimed in claim 1, wherein the handle extends radially and upwardly away from the pedestal.

9. The assembly as claimed in claim 8, wherein the spring is a coiled spring.

10. An adjustable handle assembly for mounting on a threaded shaft, comprising:
    a generally annular base having a top and a bottom;
    an arm extending away from the base;
    a shaft passage extending through the base from the top to the bottom;
    an outer surface on one side of the base opposite the arm, the outer surface being located a first distance from the shaft passage;
    a hidden surface on the base underneath the arm, the hidden surface being located a second distance from the shaft passage, the second distance being greater than the first distance;
    a transverse passage extending radially into the outer surface, through the shaft passage and toward the hidden surface, the transverse passage opening away from the arm and having an end adjacent the hidden surface;
    a shaft release plunger disposed in the transverse passage, the shaft release plunger having a contact surface adjacent the outer surface of the base and a rear surface adjacent the hidden surface;
    an aperture extending through the shaft release plunger between the contact surface and the rear surface, the aperture having an inner portion partially defined by a plurality of threads adjacent the rear surface; and
    a spring confined between the rear surface of the shaft release plunger and the end of the transverse passage, the spring biasing the contact surface of the shaft release plunger outwardly of the outer surface.

11. The assembly as claimed in claim 10, wherein the base and the arm form an integral body.

12. The assembly as claimed in claim 11, wherein the arm is joined to the top of the base and extends radially and upwardly away from the base.

13. The assembly as claimed in claim 12, wherein the base has an axis and the shaft passage extends through the axis of the base.

14. The assembly as claimed in claim 13, wherein the hidden surface extends away from the base under the arm.

15. The assembly as claimed in claim 14, wherein the shaft passage is generally cylindrical with a shaft passage diameter and the transverse passage is generally cylindrical with a transverse passage diameter, the shaft passage diameter being approximately equal to the transverse passage diameter.

16. The assembly as claimed in claim 15, wherein the spring is a coiled spring.

17. An adjustable assembly adapted to be clamped onto a threaded shaft, including:

a body having a top and a clamp bottom;

a bore extending through the body from the top to the bottom;

a transverse passage opening on one side of the body and extending through the bore and to an end in the opposite side of the body;

a release plunger disposed in the transverse passage, the release plunger having an aperture surrounding the bore, a front face normally extending out of the opening, and a rear face adjacent the end of the transverse passage;

a spring confined between the end of the transverse passage and the rear face of the member, the spring biasing the member outwardly from the body; and a handle the top of the body and extending away from the body to a free end located outwardly from the body, said body forming a generally annular pedestal locating the handle a distance from the clamp bottom.

18. The assembly as claimed in claim 17 wherein said handle is located on the opposite side of the pedestal and comprises an elongate arm extending radially outwardly from the body and having a free end away from the pedestal, said passage opening located across the pedestal from the arm.

19. The assembly as claimed in claim 18 wherein the free end of the handle is located above the top of the pedestal.

20. The assembly as claimed in claim 18, wherein the handle is straight.

21. The assembly as claimed in any of claim 17 including a protuberance extending outwardly from the pedestal under the handle, wherein the end of the transverse passage is located in the protuberance and the passage opens away from the handle.

22. The assembly as claimed in claim 21 wherein said opening is spaced a first distance from the bore and said passage end is spaced a second distance from the bore, the first distance being smaller than the second distance.

23. An assembly as claimed in claim 17 wherein said handle and body are integral.

* * * * *

UNITED STATES PATENT AND TRADEMARK OFFICE
CERTIFICATE OF CORRECTION

PATENT NO. : 5,898,974
DATED : May 4, 1999
INVENTOR(S) : David C. Boyer

It is certified that error appears in the above-identified patent and that said Letters Patent is hereby corrected as shown below:

Claim 7, line 22, change "3" to --6--.

Claim 17, line 1, after "a handle" insert --on--.

Signed and Sealed this

Twenty-fourth Day of August, 1999

Attest:

Attesting Officer

Q. TODD DICKINSON

Acting Commissioner of Patents and Trademarks